United States Patent
Obata et al.

(10) Patent No.: US 6,653,880 B2
(45) Date of Patent: Nov. 25, 2003

(54) SEMICONDUCTOR INTEGRATED CIRCUIT DEVICE FORMING POWER SOURCES HAVING DIFFERENT VOLTAGES FOR OPERATING CIRCUIT BLOCKS

(75) Inventors: Hiroyuki Obata, Nukata-gun (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/912,059

(22) Filed: Jul. 25, 2001

(65) Prior Publication Data

US 2002/0021597 A1 Feb. 21, 2002

(30) Foreign Application Priority Data

Jul. 27, 2000 (JP) .................................... 2000-227247

(51) Int. Cl.$^7$ ................................................ H03K 3/02
(52) U.S. Cl. ....................... 327/198; 327/143; 365/226
(58) Field of Search .............................. 327/198, 199, 327/530, 544, 333, 142, 143, 154, 319; 365/226, 227, 229

(56) References Cited

U.S. PATENT DOCUMENTS

| 5,070,450 A | * 12/1991 | Holman et al. ................. 713/1 |
| 5,153,452 A | * 10/1992 | Iwamura et al. ............ 327/530 |
| 5,860,125 A | * 1/1999 | Reents ........................ 365/227 |

FOREIGN PATENT DOCUMENTS

| JP | A-6-19412 | 1/1994 |
| JP | A-7-86905 | 3/1995 |
| JP | A-8-106335 | 4/1996 |
| JP | A-8-186484 | 7/1996 |

* cited by examiner

Primary Examiner—Minh Nguyen
(74) Attorney, Agent, or Firm—Posz & Bethards, PLC

(57) ABSTRACT

A microcomputer prevents an unnecessary signal from being outputted before the microcomputer is released from a reset state when the microcomputer includes a plurality of circuit blocks operating at different power source voltages. A reset signal transmitted to an input/output terminal unit of the microcomputer is generated by carrying out an OR operation between reset signals transmitted to a 3 V system circuit unit and a 5 V system circuit unit by an OR gate.

9 Claims, 4 Drawing Sheets

SEMICONDUCTOR INTEGRATED CIRCUIT DEVICE FORMING POWER SOURCES HAVING DIFFERENT VOLTAGES FOR OPERATING CIRCUIT BLOCKS

CROSS REFERENCE TO RELATED APPLICATIONS

This application is based upon Japanese Patent Application No. 2000-227247 filed on Jul. 27, 2000, the contents of which are incorporated herein by reference.

BACKGROUND OF THE INVENTION

1. Field of the Invention

This invention relates to a semiconductor integrated circuit device including a plurality of circuit blocks operating at different power source voltages.

2. Description of the Related Art

Microcomputers in general supply a single power source voltage to each internal circuit unit and give a common reset signal to operate it. As the internal circuits constituting the microcomputer have become smaller, in scale in recent years, the power source voltage applied to the internal circuits is divided in some cases into plural systems.

In other words, when miniaturization of the internal circuits reaches a certain level, the power source voltage must be set to a low level in view of a withstand voltage of each element formed in a chip. For example, a circuit portion corresponding to a core unit performing a principal function of the microcomputer is caused to operate at 3 V and an interface unit generating a signal to be outputted to external devices is caused to operate at 5 V in conformity with signal levels of peripheral circuits connected outside the microcomputer.

FIG. 4 illustrates an example of the microcomputer devised by inventors of the present invention. A microcomputer 1 includes therein a 5 V power source circuit 2 and a 3 V (3.3 V, in practice) power source circuit 3. The 5 V power source circuit 2 is so constituted as to generate a 5 V power source upon receiving power from a power supply terminal Vcc. The generated 5 V power is supplied to the 3 V power source circuit 3, a 3 V reset generation circuit 4, a 5 V reset generation circuit 5, a 5 V system circuit unit 6 and an input/output terminal unit 7. The 3 V power is supplied to the 3 V reset generation circuit 4 and a 3 V system circuit unit 8.

3 V and 5 V reset signals are generated at the 3 V and 5 V reset generation circuits 4 and 5, and are supplied to the circuit unit of each system. In other words, the 5 V power source is supplied as an operation power source to the 3 V reset generation circuit 4, and the 3 V reset signal is outputted when the rise of the 3 V power source is sensed.

Signals inputted from outside to the microcomputer 1 are given from the input/output terminal unit 7 to the 3 V system circuit unit 8 through the 5 V system circuit unit 6. Signals outputted from the 3 V system circuit unit 8 to outside are outputted to the input/output terminal unit 7 through the 5 V system circuit unit 6. The input/output terminal unit 7 communicates to external devices to input signals from the external devices and output the signals from the 3 V system circuit unit 8 and the 5 V system circuit unit 6. Incidentally, a level conversion circuit, not shown, is interposed between the 3 V system circuit unit 8 and the 5 V system circuit unit 6 to change a signal level between 3 V-signal and 5 V-signal.

However, when the reset signal is supplied to each circuit unit, the following problems develop if each reset time is different. FIG. 5 is a timing chart that shows an example of a power-ON reset sequence in the microcomputer 1. When the 5 V power source is first activated and reaches a reset terminating voltage, the 5 V reset signal becomes inactive, so that reset of the 5 V system circuit unit 6 is terminated (see FIGS. 5(a) and (b)). The 5 V system reset signal remains indefinite for a limited period in which the 5 V power source reaches the operation start voltage of the 5 V system (see FIG. 5(b)).

On the other hand, the rise of the 3 V power source is likely to be slower than that of the 5 V power source because the 3 V power source is generated on the basis in the generation of the 5 V power source. In such a case, a timing at which the 3 V power source reaches reset terminating voltage is likely to occur after the 5 V power source reaches the reset terminating voltage (see FIGS. 5(c) and (d)). Since the 3 V reset generation circuit 4 starts operating upon receiving the supply of the 5 V power source, the 3 V system reset signal remains indefinite until the 5 V power source reaches 5 V system operation start voltage (see FIG. 5(d)).

Incidentally, scale of the ordinate (voltage) is magnified in FIG. 5(c) and the rise is slow. Therefore, the rise of the 3 V power source is shown rising linearly as in FIG. 5(c). When the rise waveform of the 3 V power source is macroscopically observed in practice, however, it has a waveform similar to that of the rise of the 5 V power source.

The output signal of the 3 V system circuit unit 8 remains indefinite until the 3 V power source reaches 3 V system operation start voltage. For the period in which the 3 V system reset signal is active after reaching the operation start voltage the output signal is set at an initial value (voltage at the time of the reset operation; "L" in FIG. 5((e)). Therefore, the output signal of the 5 V system circuit unit 6 is indefinite during the period in which the output signal of the 3 V system circuit unit 8 is indefinite although the 5 V system reset signal has already been terminated (refer to arrow in FIG. 5(f)). The output level of the input/output terminal unit 7 that receives this signal is also indefinite.

As described above, when the voltage applied to the 3 V system circuit unit 8 is still below the operation start voltage in the situation where the reset is released in the 5 V system circuit unit 6, the signal that becomes active (such as "H") might be outputted to outside through the 5 V system circuit unit 6 before the reset of the core unit of the microcomputer 1 is finished. When the active signal is outputted unintentionally, a wrong operation may occur in the system in which the microcomputer 1 functions as the central control unit.

When microcomputers 1 having the same performance are mass-produced and exist in a system, the reset sequence in each of the overall microcomputers 1 does not always attain the same sequence as the one shown in FIG. 5 due to variance of the discrete microcomputers 1. The rise on the 3 V power source may be faster than the rise of the 5 V power source depending on the discrete microcomputers 1, for example. When such variance of discrete microcomputers 1 during mass-production is taken into consideration, fail-safe measure for securing the reset sequence becomes very important in microcomputers operating at power sources of a plurality of systems.

SUMMARY OF THE INVENTION

In view of the problems described above, the present invention aims at providing a semiconductor integrated circuit device capable of preventing an unnecessary signal from being outputted to outside before reset is terminated when a plurality of circuit blocks operate at different power source voltages.

In the semiconductor integrated circuit device according to the present invention, a reset signal to be given to an input/output interface unit for exchanging input/output signals with external devices is generated on the basis of a reset signal having the longest reset period among reset signals given to a plurality of circuit blocks operating at different power source voltages, respectively.

Preferably, the reset signal to be given to the input/output interface unit is generated by OR between a plurality of reset signals, and an OR element outputting the OR signal is operated by the same power source as the power source for the input/output interface unit.

In other words, reset of the input/output interface unit is not terminated until a reset signal having the longest reset period among the reset signals given to respective circuit blocks is terminated. Therefore, when a plurality of circuit blocks is disposed in series with the input/output interface unit, a reset period of the reset signal supplied to a circuit block closest to the input/output interface unit becomes relatively short, and even when reset is terminated previously, the input/output interface unit does not output at that point a signal that becomes active to outside unintentionally.

In consequence, a system including the semiconductor integrated circuit device can be prevented from wrongly operating. Even when semiconductor integrated circuit devices are mass-produced and are employed and there is the possibility that the reset sequence of different patterns exists due to variance of discrete microcomputers, the present invention can take fail-safe measure at a high level.

Other objects, features and advantages of the present invention will become more apparent from the following detailed description made with reference to the accompanying drawings.

DESCRIPTION OF THE PREFERRED EMBODIMENT

Figure 1:
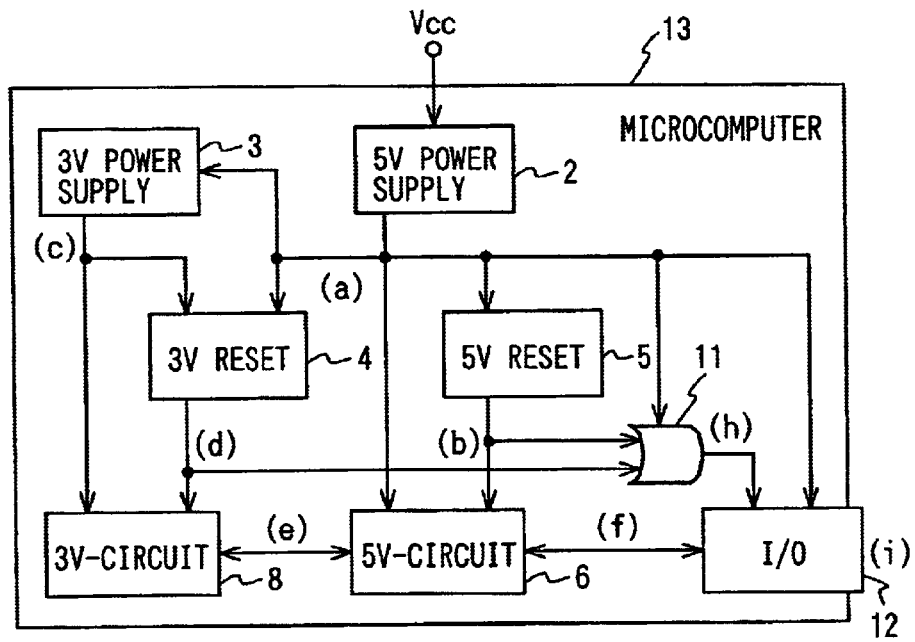
FIG. 1 is a functional block diagram showing an outline of an electric construction of a microcomputer according to an embodiment of the present invention.

Hereinafter, an embodiment of the present invention when applied to a microcomputer will be explained with reference to FIGS. 1 to 3. Incidentally, like reference numerals will be used in these drawings to identify like constituent members as in FIG. 4, and the explanation will be given particularly on the different portions while omitting the explanation of like constituent members.

A semiconductor integrated circuit device 13 is constituted with a semiconductor chip diced from a semiconductor wafer. The semiconductor integrated circuit device 13 has a similar configuration to the integral circuit device 1 shown in FIG. 4 except a OR gate 11. Power is supplied from outside to the 5 V power source circuit 2 through external connection terminals (not shown) such as wire bonds.

In this embodiment, a 3 V reset signal and a 5 V reset signal are given to the OR gate 11. An output signal of this OR gate 11 is given as a reset signal to an input/output terminal unit (input/output interface unit) 12. The OR gate 11 operates when the 5 V power source is given thereto.

Incidentally, when the high level of the 3 V reset signal is less than a threshold value of the high level of the OR gate 11, the 3 V reset signal is converted at appropriate level and is given to the input terminal of the OR gate 11. For example, the output terminal is pulled up to 5 V through a buffer.

The input/output terminal unit 12 is constituted in such a manner as to keep the level of the output signal to outside at an initial value ("L", for example, at the voltage of reset) during the period in which the OR gate 11 outputs the reset signal. For example, when the output interface comprises CMOS, not shown concretely in the drawing, an n-type MOSFET on the side of the ground is turned ON when the reset signal is active ("H"), irrespective of the state of the output data. The rest of the constructions are the same as those shown in FIG. 4, and thus the microcomputer (semiconductor integrated circuit device) 13 is constituted.

Figure 2:
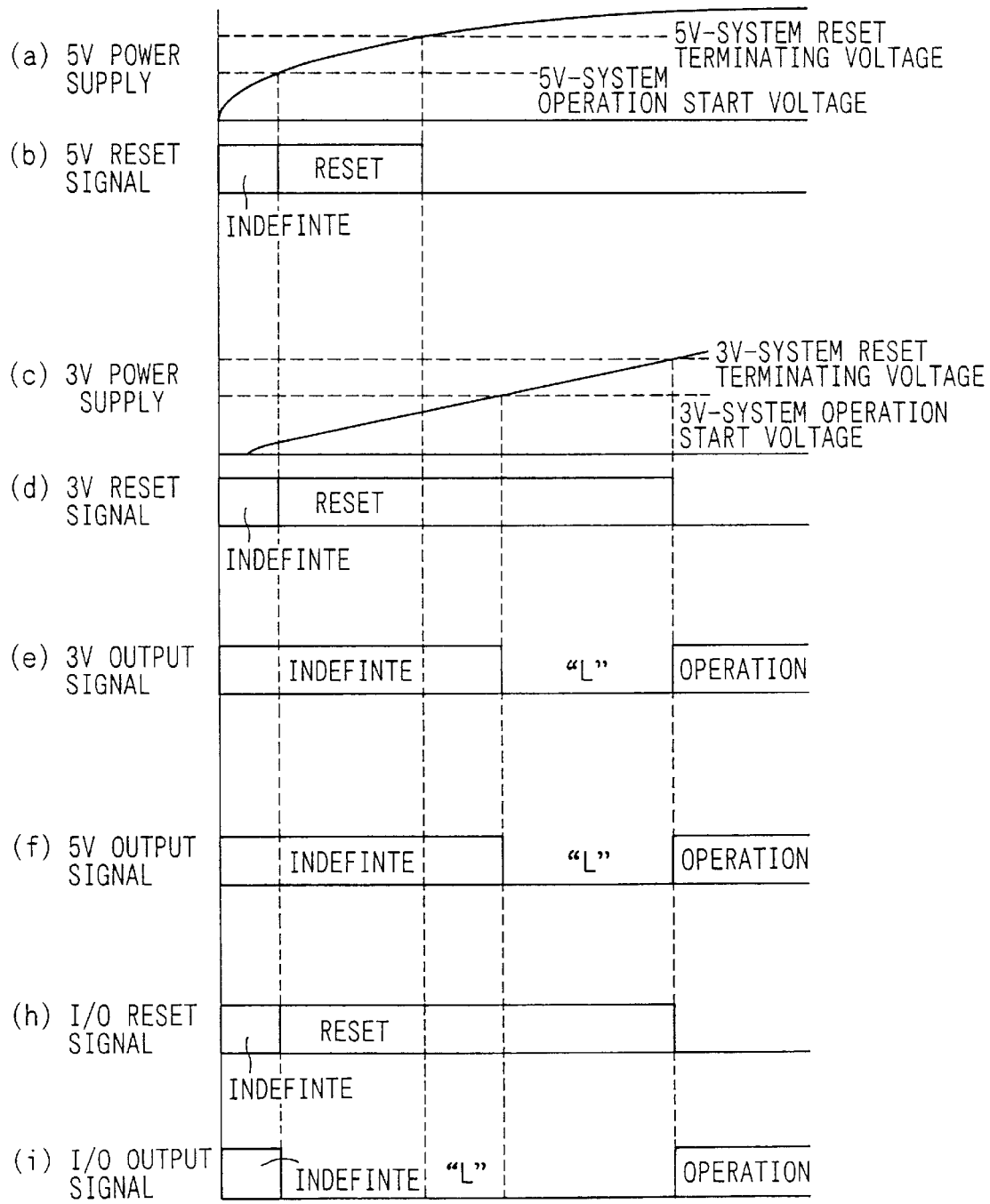
FIG. 2 is a timing chart of each unit at power-ON reset sequence of the embodiment.
Figure 5:
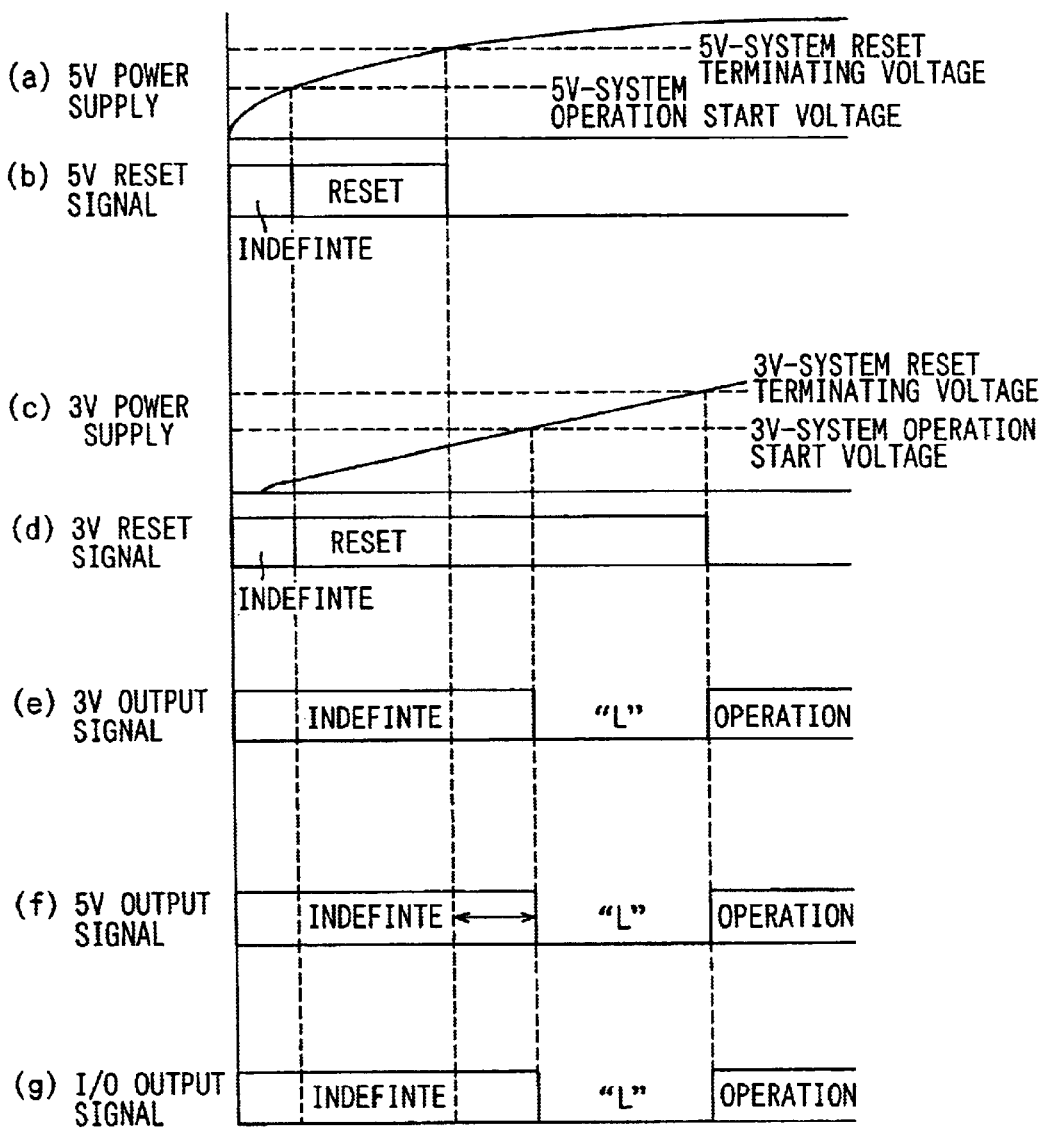
FIG. 5 is a timing chart of each unit at power-ON reset sequence of the related art.

Next, an operation of this embodiment will be explained with reference to FIG. 2 showing a timing chart. The timing from (a) to (f) is the same as those in FIG. 5. FIG. 2(h) shows the timing of the reset signal given to the input/output terminal unit 12. This reset signal is generated by the OR gate 11 as a result of an OR operation between the 3 V reset signal and the 5 V reset signal. Therefore, the reset signal becomes active in accordance with one of these reset signals that has a longer active period. Consequently, the reset signal shown in FIG. 2(h) remains indefinite until the 5 V power source shown in FIG. 2(b) reaches the 5 V system operation start voltage.

FIG. 2(i) shows the output signal of the input/output terminal unit 12. Receiving the reset signal shown in FIG. 2(h), the input/output terminal unit 12 keeps outputting "L" during the period in which this reset signal is active. When the reset signal thereafter changes to inactive and whereby reset is released, the input/output terminal unit 12 starts to perform an normal operation of outputting a signal of a level corresponding to the signal outputted from the 3 V system circuit unit (circuit block) 8.

Figure 4:
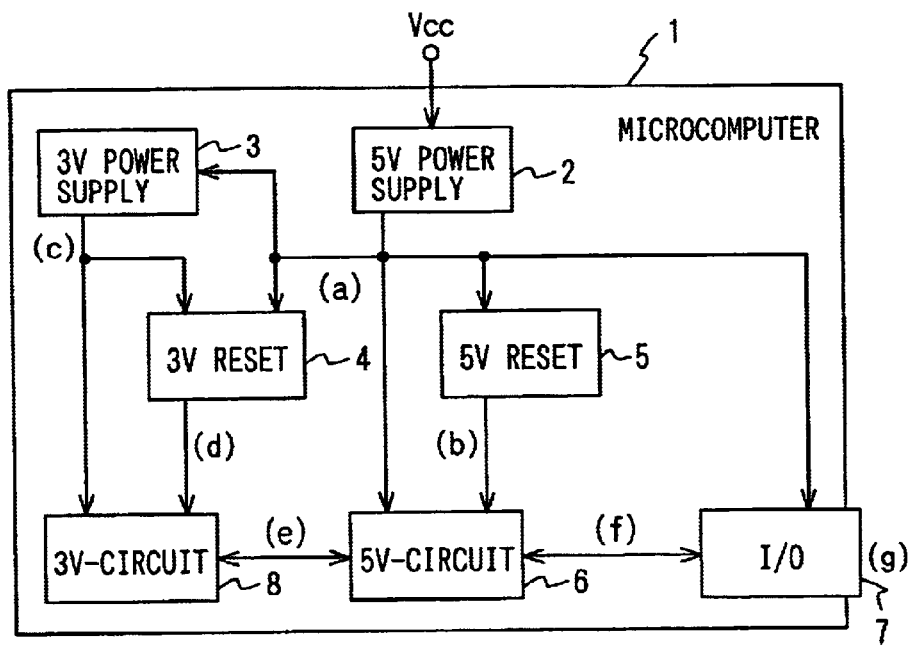
FIG. 4 is a functional block diagram showing a related art construction.

In other words, the period in which the output signal level of the 5 V system circuit unit (circuit block) 6 is indefinite is similar to that of the microcomputer shown in FIG. 4, but the period in which the output signal level of the input/output terminal unit 12 is indefinite is extremely shorter than the period of the microcomputer shown in FIG. 4 (see FIG. 5(g)). In this case, terminating timing of the reset signal outputted eventually from the OR gate 11 is equal to terminating timing of the 3 V reset signal.

Figure 3:
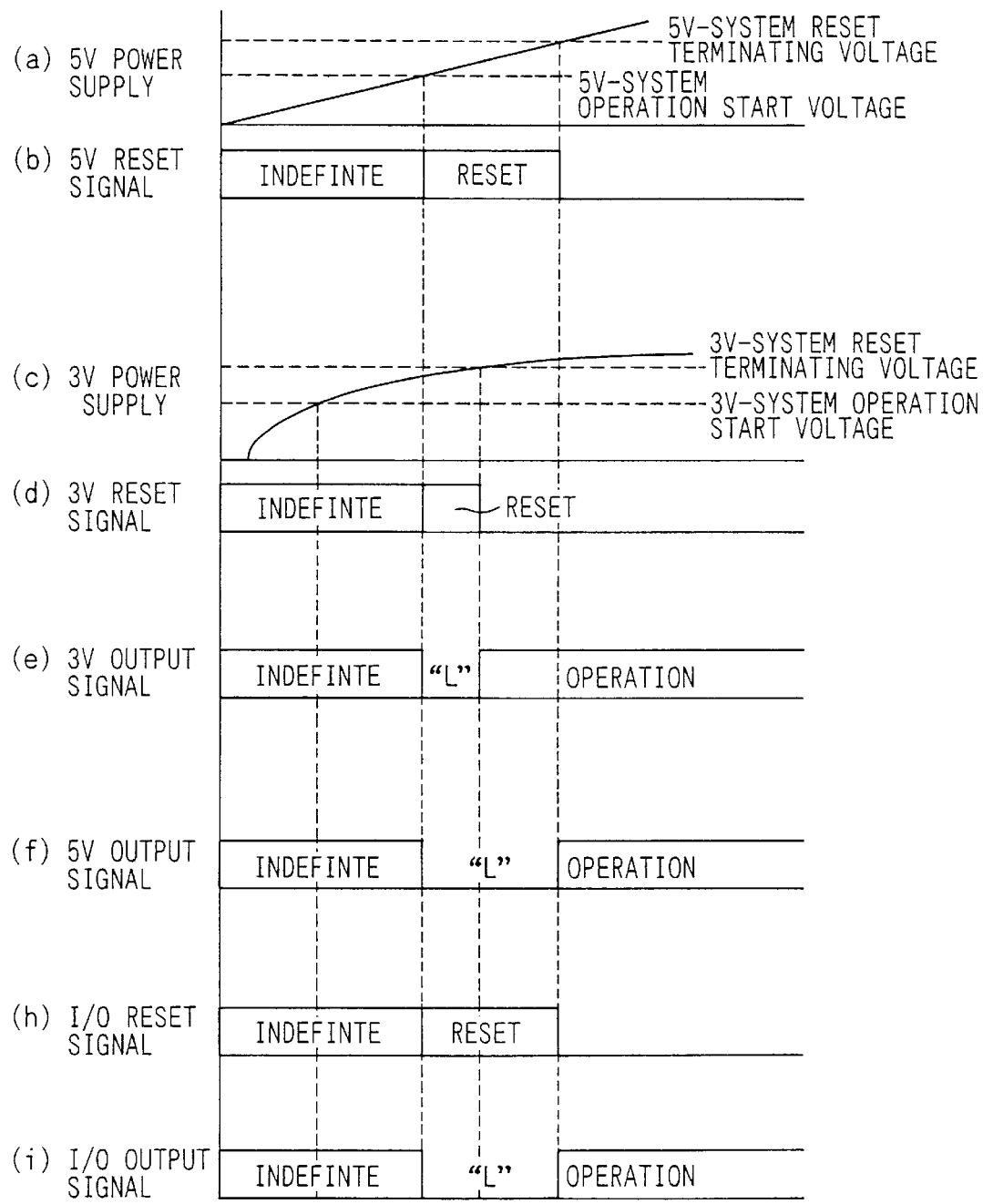
FIG. 3 is a timing chart of each unit at power-ON reset sequence, different from the timing chart shown in FIG. 2.

On the other hand, FIG. 3 shows the case where a power-ON reset sequence assumes a different pattern from that in FIG. 2 due to difference characteristic in an operation of each circuit of discrete microcomputers 13 having the same construction. As shown in FIGS. 3(a) and 3(c), the rise of the 5 V power source is relatively slow but the rise of the 3 V power source is relatively fast contrary to FIG. 2.

In this case, the 3 V power source reaches the operation start voltage more quickly than the 5 V power source. Since the 3 V system reset signal is generated from the 5 V power source, however, for the period before the 5 V power source reaches the operation start voltage it is indefinite in the same way as the 5 V system reset signal (see FIG. 3(d)).

When the 5 V power source reaches the operation start voltage, both 5 V and 3 V reset signals become active. The 3 V reset signal is first terminated and then the 5 V reset signal is terminated (see FIGS. 3(d) and (b)). In this case, the terminating timing of the reset signal outputted by the OR gate 11 to the input/output terminal unit 12 is equal to the terminating timing of the 5 V reset signal shown in FIG. 3(b), as shown in FIG. 3(h).

In this case, the indefinite period of the signal outputted from the input/output terminal unit 12 to outside is longer than that in the case shown in FIG. 2(i) as shown in FIG. 3(i). However, this is a period in which the 5 V power source is at a relatively low level before reaching the operation start voltage and the indefinite level of the signal is also low. In consequence, its influences on the external peripheral circuits are extremely small.

As described above, in this embodiment, the reset signal to be given to the input/output terminal unit 12 of the microcomputer 13 is generated by the OR operation of the reset signals given to the 3 V system circuit unit 8 and to the 5 V system circuit unit 6, respectively.

In other words, reset of the input/output terminal unit 12 is not terminated until the reset signal having the longest reset period is terminated among the reset signals given to the circuit units 6 and 8. As shown in FIG. 2, for example, even when the reset period of the reset signal supplied to the 5 V system circuit unit 6 close to the input/output terminal unit 12 is first terminated, the signal that becomes active is not outputted to outside unintentionally at that time from the input/output terminal unit 12. Therefore, the system including the microcomputers 13 is prevented from operating wrongly.

Even when the reset sequence in each microcomputer 13 is different each other as shown in FIGS. 2 and 3 due to variance of microcomputers 13 occurs by the mass-production, the present invention can execute the fail-safe measure at a high level.

The present invention is not limited to the embodiment described above and shown in the drawings, but can be modified in the following ways.

Both 3 V power source and 5 V power source may be generated independently outside the microcomputer 13, and may be supplied to the microcomputer 13.

The kind of the power source voltages may be three or more. In this case, an OR operation may be carried out among the reset signals generated for the power sources and may be inputted to the input/output interface unit.

Moreover, the present invention can be applied to a semiconductor integrated circuit device (such as a DMA controller as LSI for a specific application or communication LSI) in which plural circuit blocks each operating at a different power source voltage are disposed in series with the input/output interface unit and an independent reset signal is applied to each circuit block.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor integrated circuit device comprising:
a power source circuit for receiving power input from an external power source and for outputting different power source voltages;
a plurality of circuit blocks each of which respectively operates at one of the different power source voltages;
reset generation circuits for generating independent reset signals and for applying each of the reset signals to one of said plurality of circuit blocks; and
an input/output interface unit to which each of said plurality of circuit blocks is connected in series, for communicating to an external device;
wherein said input/output interface unit receives an input reset signal that is generated by a logical circuit and is generated based on a longer one of the reset signals applied to said plurality of circuit blocks, respectively.

2. A semiconductor integrated circuit device according to claim 1, wherein the
logical circuit is for performing an OR operation between the reset signals given to said plurality of circuit blocks, respectively, and for outputting an OR signal as a result of the OR operation to the input/output interface unit as the input reset signal given to said input/output interface unit.

3. A semiconductor integrated circuit device according to claim 2, wherein the logical circuit operates on a power source which is the same as a power source supplied to said input/output interface unit.

4. The semiconductor integrated circuit device according to claim 1, further comprising:
a plurality of reset generation circuits each of which respectively corresponds to one of the plurality of circuit blocks and outputs one of the respective independent reset signals thereto,
wherein the different power source voltages output from the power source circuit are respectively applied to each of said plurality of reset generation circuits to enable said plurality of reset generation circuits to generate the respective independent reset signals.

5. The semiconductor integrated circuit device according to claim 1, wherein the power source circuit has a first power source circuit for outputting a first power source voltage as one of the power source voltages and a second power source circuit for outputting a second power source voltage as the other one of the power source voltages, and the second power source circuit receives the first power source voltage and then outputs the second power source voltage.

6. A semiconductor integrated circuit device comprising:
a power source circuit for receiving power input from an external power source and for outputting first and second power source voltages, wherein the first power source voltage is different from the second power source voltage;
a first circuit block that operates on the first power source voltage and that is reset by a first reset signal;
a second circuit block that operates on the second power source voltage and that is reset by a second reset signal;
an input/output interface unit to which the first and second circuit blocks are connected for communicating with an external device; and
a selection circuit for selecting a longer one of the first reset signal and the second reset signal, and for applying the longer one of the first reset signal and the second reset signal to the input/output interface unit as a reset signal.

7. A semiconductor integrated circuit device according to claim 6, wherein the selection circuit operates on a power source which is the same as a power source supplied to said input/output interface unit.

8. The semiconductor integrated circuit device according to claim 6, further comprising:
   a first reset generation circuit for outputting the first reset signal to said first circuit block, and
   a second reset generation circuit for outputting the second reset signal to said second circuit block;
   wherein the first power source voltage is output from the power source circuit and is applied to the first reset generation circuit, and the second power source voltage is output from the power source circuit and is applied to the second reset generation circuit to enable the first and second reset generation circuits to generate the first and second reset signals, respectively.

9. The semiconductor integrated circuit device according to claim 6, wherein the power source circuit has a first power source circuit for outputting the first power source voltage and a second power source circuit for outputting the second power source voltage, and the second power source circuit receives the first power source voltage and then outputs the second power source voltage.

* * * * *